Oct. 23, 1951 — F. E. SNOW — 2,572,401
SEALED CHANNEL PROTECTOR FOR BLIND NUTS
Filed Aug. 30, 1947
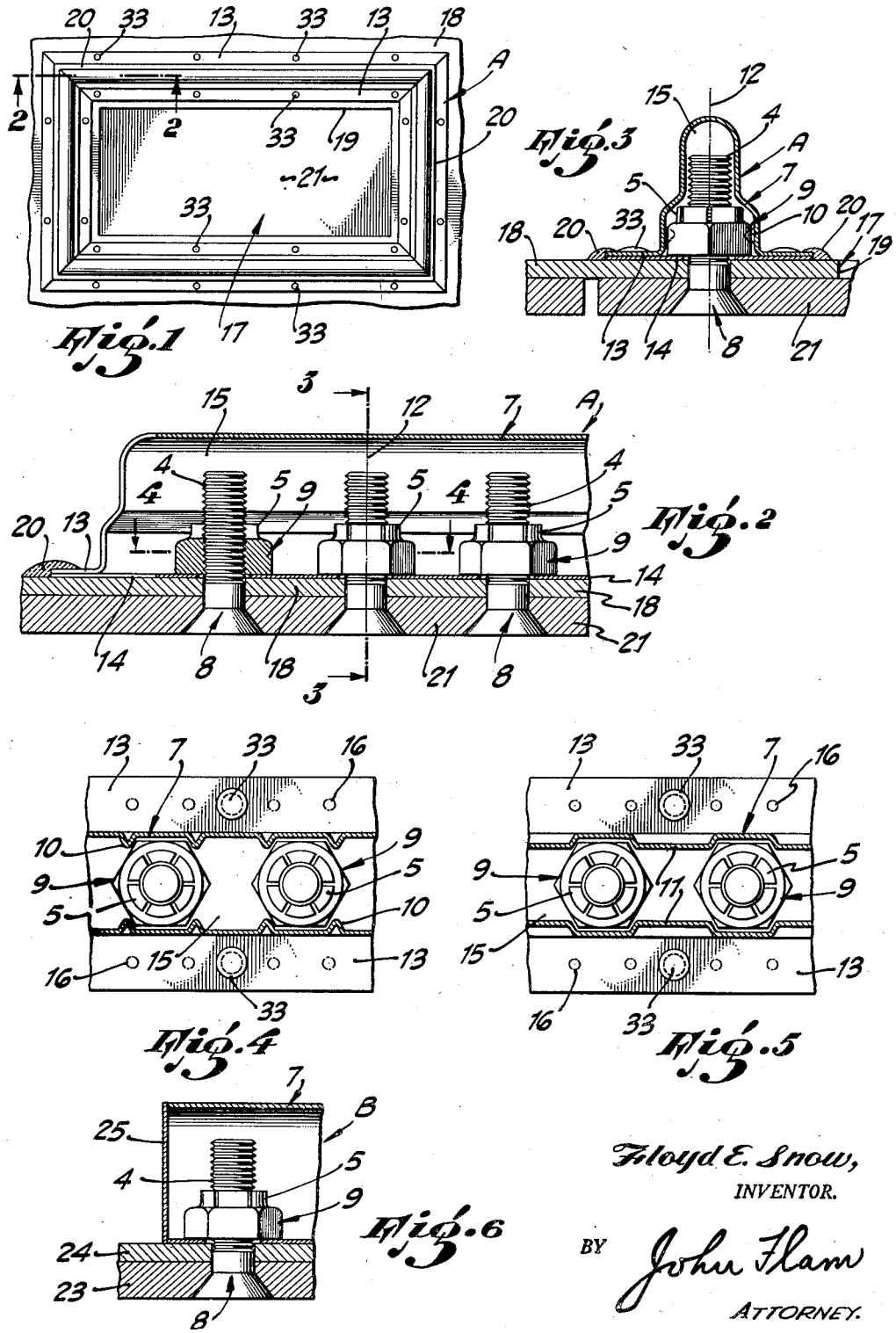
Floyd E. Snow,
INVENTOR.
BY John Flam
ATTORNEY.

Patented Oct. 23, 1951

2,572,401

UNITED STATES PATENT OFFICE 2,572,401

SEALED CHANNEL PROTECTOR FOR BLIND NUTS

Floyd E. Snow, Pasadena, Calif., assignor to Technical Coatings, Inc., Los Angeles, Calif., a corporation of California Application August 30, 1947, Serial No. 771,507

1 Claim. (Cl. 220—55)

This invention relates to fastening devices, and particularly to such devices as may be used for attaching parts together by bolts or screws.

For example, airplane fuel tanks are provided with covers that are attached by a series of bolts arranged around the edges of the tank opening. The nuts are located inside the tank, and the bolts are inserted exteriorly thereof.

It is one of the objects of this invention to provide a simple, lightweight, and inexpensive protector that seals a space around all of the nuts.

It is another object of this invention to provide a channel structure that may easily be sealed off, and which accommodates a series of nuts in such manner as to restrain them against turning during the installation of the bolts, but loosely enough to absorb manufacturing tolerances in hole location.

It is still another object of this invention to provide a simple and inexpensive channel arrangement for holding nuts, and which may be made of indefinite length and cut readily to fit any specific installation.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it to be understood that this detailed description is not to be taken in a limiting sense, since the scope of the invention is best defined by the appended claim.

Referring to the drawing:

Figure 1 is a plan view of an installation embodying the principles of this invention;

Fig. 2 is a sectional view on an enlarged scale, taken along the line 2—2 of Fig. 1;

Fig. 3 is a sectional view, taken along the plane 3—3 of Fig. 2;

Fig. 4 is a plan view, taken as indicated by the numerals 4—4 of Fig. 2;

Fig. 5 is a plan view similar to Fig. 4, but showing a slightly modified form of the invention; and Fig. 6 is a sectional view illustrating another use of the present invention.

As shown in Figs. 1, 2, 3, and 4, a cover plate 21 is utilized to cover and seal an opening 17 in a structure 18, such as an airplane gasoline tank, or the like. The cover plate 21 is fastened about the edges 19 of the structure 18 by bolts 8 and nuts 9, which nuts are on the inner side of the tank. Any conventional sealing means may be used in connection with the cover plate itself, but such sealing would not prevent leakage of material between the threads of the bolts 8 and nuts 9. Furthermore, since the bolts are inserted exteriorly, the nuts 9 must be restrained against any substantial movement. For the purposes of sealing and restraining the nut against movement, the housing A is provided; and it will now be described.

As illustrated in Figs. 2 and 3, an elongated channel member 7 is in the form of a continuous strip made from material such as stainless steel or cadmium plated steel. As shown in Fig. 3, the cross-section of this channel member 7 is made to conform to the general contour of an assembled bolt 8 and nut 9 by simple bending operations. The channel member 7 can be of sufficient depth to accommodate the inwardly projecting shanks of long bolts.

The nuts 9 may be of any conventional square or hexagonal lock type; for example, the crown 5 of the nut 9 may be slotted radially in order that it may resiliently contact the threads 4 of the bolt 8. These nuts 9 are placed longitudinally along the channel member 7; and they are confined by dimples 10 (Fig. 4) or indentations 11 (Fig. 5) formed integrally with the walls of the channel member 7. Thus, the nuts 9 are confined to a definite longitudinal spacing, and are prevented from rotating about the axes 12 thereof.

The channel member 7 provides a continuous recess on one side and has outwardly extending flanges 13 at its open side cooperating with an elongated cover strip 14 to form a substantially closed space 15 in which the nuts 9 are accommodated. For this purpose the flanges 13 of the channel member 7 and the cover strip 14 are welded together at intermediate portions along the length thereof, as shown by the spot welds at 16.

In order to permit the passage of the bolts 8, the cover strip 14 is provided with holes along its length which correspond to the spacing of the nuts 9 within the channel member 7. The apparatus as described thus far constitutes an assembled unit that may be attached wherever needed. These holes are large enough to ensure that the nuts can be alined with the bolts in spite of manufacturing tolerances. The nuts 9 are sufficiently loosely confined to permit them to conform with the position of the corresponding bolts.

As shown in Fig. 1, assembled units, above described, are placed along the edge 19 of the inside of an opening 17.

These units are fitted together, and are joined in an appropriate manner to form a continuous frame about the inside of the opening 17. For the purpose of securing the frame to the edges 19 of the opening 17, rivets 33 extend through the flanges 13, the cover strip 14, and the structure 18. The asembled unit is sealed around its edges by appropriate means, such as the putty 20; thus, the contents of the structure 18 are neither in contact with the nut 9 and the bolt 8, nor in communication with the outside of the structure 18.

The cover plate 21 has apertures placed about its periphery which allow the bolts 8 to engage the nuts 9 within the housing A. Thus, a lightweight and fluid-tight sealing means is provided for use in connection with aircraft assembly, or the like.

Fig. 6 illustrates another adaptation of this invention. For the purpose of illustration, it is assumed that it is desired to attach a member 23 to the exterior of a structure 24 while keeping fluid-tight the structure 24 to which the member 23 is attached. For this purpose, the housing B is similar to the housing A, except that the ends of the channel member 7 are sealed either by putty or by providing an end plate 25. The assembled unit is riveted and sealed on the inside of the structure 24 in the same manner, as described in connection with Fig. 1. The member 23 is provided with holes adapted to cooperate with the holes of the structure 24 to permit the passage of the bolts 8. Thus, an economical and lightweight unit is provided which can readily serve as the means whereby a member can be attached to the exterior of an airplane wing section, or the like.

The inventor claims:

In combination: a structure having an apertured wall; a closure for said structure on one side of said wall having edges overlying the edges of the aperture of said wall; and a self-contained fastening device enabling said closure to be secured to said wall, comprising: a plurality of elongate strips of channel configuration forming a continuous recess opening in one side of the strips, said strips each having a pair of outwardly directed flanges adjacent said open side, said strips each forming a pair of opposed imperforate side portions respectively having a series of longitudinally spaced indentations; a plurality of nuts received in said strips between said indentations; cover plates for the open sides of said strips, and secured thereto, said cover plates having a series of longitudinally spaced apertures; means securing said cover plates and said strips around the aperture of said wall and on the side thereof opposite said closure, said cover plates and strips forming a continuous frame; and a plurality of bolts passing through said closure and said wall and engaging said nuts in said channels.

FLOYD E. SNOW.

REFERENCES CITED

The following references are of record in the file of this patent:

UNITED STATES PATENTS

| Number | Name | Date |
|---|---|---|
| 1,012,190 | Clark | Dec. 19, 1911 |
| 1,187,491 | Bogenberger | June 20, 1916 |
| 1,464,216 | Paden | Aug. 7, 1923 |
| 1,845,409 | Golden | Feb. 16, 1932 |
| 2,144,350 | Swanstrom | Jan. 17, 1939 |
| 2,353,589 | Sandberg | July 11, 1944 |
| 2,385,777 | Ebert | Oct. 2, 1945 |
| 2,396,005 | Gross | Mar. 5, 1946 |